United States Patent
Aldén et al.

(10) Patent No.: US 10,232,876 B2
(45) Date of Patent: Mar. 19, 2019

(54) METHOD, SYSTEM AND COMPUTER PROGRAM FOR CONTROLLING PROPULSION OF A DRILLING RIG AS WELL AS A DRILLING RIG

(71) Applicant: EPIROC ROCK DRILLS AKTIEBOLAG, Örebro (SE)

(72) Inventors: Erik Aldén, Örebro (FI); Fredrik Öhman, Örebro (SE); Erik Ahlström, Kungsbacka (SE)

(73) Assignee: EPIROC ROCK DRILLS AKTIEBOLAG, Örebro (SE)

( * ) Notice: Subject to any disclaimer, the term of this patent is extended or adjusted under 35 U.S.C. 154(b) by 272 days.

(21) Appl. No.: 15/112,277

(22) PCT Filed: Jan. 29, 2015

(86) PCT No.: PCT/SE2015/050099
§ 371 (c)(1),
(2) Date: Jul. 18, 2016

(87) PCT Pub. No.: WO2015/115985
PCT Pub. Date: Aug. 6, 2015

(65) Prior Publication Data
US 2016/0339956 A1    Nov. 24, 2016

(30) Foreign Application Priority Data
Feb. 3, 2014    (SE) .................................. 1450116

(51) Int. Cl.
*B60W 10/04*    (2006.01)
*B60W 10/11*    (2012.01)
(Continued)

(52) U.S. Cl.
CPC ............ *B62D 11/003* (2013.01); *B62D 11/04* (2013.01); *B62D 11/12* (2013.01); *E21B 7/02* (2013.01); *E21D 11/10* (2013.01); *F16H 48/36* (2013.01)

(58) Field of Classification Search
CPC .. B60W 10/04; B60W 10/11; B60W 2300/17; B62D 11/003; B62D 11/04
See application file for complete search history.

(56) References Cited

U.S. PATENT DOCUMENTS

| 3,727,710 A | 4/1973 | Sanders et al. |
| 3,901,336 A | 8/1975 | Bendure |

(Continued)

FOREIGN PATENT DOCUMENTS

| CN | 1721253 A | 1/2006 |
| CN | 101376386 A | 3/2009 |

(Continued)

OTHER PUBLICATIONS

PCT/ISA/210—International Search Report—dated May 26, 2015 (Issued in Application No. PCT/SE2015/050099).

(Continued)

*Primary Examiner* — Edwin A Young
(74) *Attorney, Agent, or Firm* — Venable LLP; Jeffri A. Kaminski (57) ABSTRACT

A method for controlling propulsion of a drilling rig. The drilling rig includes a right propulsion unit and a left propulsion unit and mutually independent speed control and a transmission for driving the right propulsion unit and the left propulsion unit. The transmission provides at least two gear states of a gear box. A propulsion speed is request for the right propulsion unit and for the left propulsion unit. A difference is determined between a requested propulsion speed of the right propulsion unit and the left propulsion (Continued)

unit. A suitable gear state is determined based on the determined difference. Also a computer program product including program code for a computer for implementing the method. A system and a drilling rig equipped with the system.

22 Claims, 4 Drawing Sheets (51) Int. Cl.
| | | |
|---|---|---|
| *B62D 11/00* | (2006.01) | |
| *E21D 11/10* | (2006.01) | |
| *F16H 48/36* | (2012.01) | |
| *B62D 11/12* | (2006.01) | |
| *B62D 11/04* | (2006.01) | |
| *E21B 7/02* | (2006.01) | |

(56) References Cited

U.S. PATENT DOCUMENTS

| 4,226,140 | A | 10/1980 | Gaasenbeek | |
|---|---|---|---|---|
| 7,290,390 | B2 | 11/2007 | Kim | |
| 2011/0246031 | A1* | 10/2011 | Uematsu | B60K 17/35 701/50 |
| 2012/0323420 | A1* | 12/2012 | Koike | B62D 11/003 701/22 |

FOREIGN PATENT DOCUMENTS

| CN | 102114773 A | 7/2011 |
|---|---|---|
| CN | 102849106 A | 1/2013 |
| CN | 103538468 A | 1/2014 |
| JP | 2004074883 A | 3/2004 |
| JP | 2009058031 A | 3/2009 |
| JP | 2010208446 A | 9/2010 |
| JP | 2010236632 A | 10/2010 |
| RU | 2158682 C1 | 11/2000 |
| RU | 2226472 C2 | 4/2004 |
| RU | 2286281 C1 | 10/2006 |
| RU | 2469878 C2 | 12/2012 |
| RU | 2480361 C1 | 4/2013 |
| WO | WO-8402153 A1 | 6/1984 |
| WO | 2009013454 A1 | 1/2009 |
| WO | 2011049509 A1 | 4/2011 |
| WO | 2012059642 A1 | 5/2012 |
| WO | 2013089619 A1 | 6/2013 |

OTHER PUBLICATIONS

PCT/ISA/237—Written Opinion of the International Searching Authority—dated May 26, 2015 (Issued in Application No. PCT/SE2015/050099).
Form Its 201—International—Type Search Report—dated Sep. 8, 2014 (Issued in Swedish Patent Application No. 1450116-7.
Chinese Office Action and Search Report dated Jan. 30, 2018 in corresponding Chinese Patent Application No. 201580006897.1 with English language translation.
Combined Office Action and Search Report dated Jun. 2, 2017 in Chinese Patent Application No. 201580006897.1 (with English language translation).
Extended European Search Report dated Nov. 10, 2017, in corresponding European Application No. 15743219.6 (8 pages).
Swedish Office Action issued in counterpart Swedish application 1450116-7 (W/ Translation)—dated Sep. 5, 2014.
Australian Office Action dated Jul. 19, 2018 in corresponding Australian Patent Application No. 2015211429 (3 pages).
Chilean Office Action dated May 22, 2018 in corresponding Chilean Patent Application No. 201601948 (16 pages).
Russian Office Action with Search Report dated Aug. 30, 2018 in corresponding Russian Application No. 2016135634/3(055871) (11 pages).
Chilean Office Action dated Nov. 15, 2018 in corresponding Chilean Patent Application No. 201601948 (14 pages).
Japanese Office Action dated Nov. 8, 2018 in corresponding Japanese application No. 2016-567324 (6 pages).

* cited by examiner

METHOD, SYSTEM AND COMPUTER PROGRAM FOR CONTROLLING PROPULSION OF A DRILLING RIG AS WELL AS A DRILLING RIG

CROSS-REFERENCE TO RELATED APPLICATIONS

The application claims priority to Swedish patent application 1450116-7 filed 3 Feb. 2014 and is the national phase under 35 U.S.C. § 371 of PCT/SE2015/050099 filed 29 Jan. 2015.

TECHNICAL FIELD

The present invention relates to a method for controlling propulsion of a drilling rig. The invention also relates to a computer program product comprising program code for a computer for implementing a method according to the invention. The invention also relates to a system for controlling propulsion of a drilling rig and a drilling rig being equipped with such a system.

BACKGROUND

Today there are various platforms having tracks, said platforms being available for various applications. A drilling rig may be an example of such a platform having tracks. Said drilling rig may for an example be arranged for operation on a ground surface. Hereby the drilling rig may be arranged for performing various kinds of construction works.

Said platforms may be controlled by an operator, i.e. a driver may control propulsion and operation of for example tools or machines of the platform from a cabin. Alternatively said platforms may be radio controlled/remote controlled.

Said platform may be arranged for being controlled by means of so called track control. These platforms may be propelled by means of tracks or wheels. Hereby a speed of a track on a first side and speed of a second track on a second side may be controlled manually by means of suitable electronic or mechanical actuator means, for example a steering wheel and an accelerator pedal. The platform may thus be made to turn by applying different speeds of said first track and said second track.

At propulsion of the platform involving making turns various disadvantages may occur. In particular these disadvantages may occur when changing propulsion direction when propulsion is performed on a wet, muddy or sandy surface where relatively large forces are applied by means of the tracks for turning the platform about a rotational axel of the same.

These disadvantages may partly relate to tricky operation of the platform where an operator has to perform gear shifts of a transmission of a platform at same time as he must keep watch for safe propulsion. Further, the driver in some cases also has to consider carried equipment, such as for example drilling devices, during propulsion of said platform. Propulsion of a platform with two tracks may be perceived as complex by an operator, in particular when turning, because a number of work tasks needs to be carried out simultaneously or substantially simultaneously.

These disadvantages may relate to non-desired changes of operation conditions of the platform. These changes of operational conditions may relate to non-desired reduction of a current engine speed of an engine of the platform due to increased load of the platform arising during said changes of propulsion direction. Hereby non-desired stalling of the engine may occur. In certain situations said tracks hereby stop if an increased load of the platform becomes too large.

U.S. Pat. No. 7,290,390 B2 depicts a control device for a hydraulic excavator of crawler type where a slow start is provided during manual operation thereof.

SUMMARY OF THE INVENTION

There is thus a need to in a reliable, user friendly and robust way manage controlling of a platform having two tracks for propulsion of the platform.

One object of the present invention is to provide a new and advantageous method for controlling propulsion of a drilling rig.

Another object of the invention is to provide a novel and advantageous system for controlling propulsion of a drilling rig and a new and advantageous computer program for controlling propulsion of a drilling rig.

Yet another object of the invention is to provide an alternative method, an alternative system and an alternative computer program for controlling propulsion of a drilling rig.

Yet another object of the invention is to provide a user friendly method for achieving reliable propulsion of a drilling rig, where hazard for stalling and/or interruption of tracks during propulsion is reduced.

Yet another object of the invention is to provide a method, a system and a computer program for improving performance of a so called crawler type drilling rig.

Some of said objects are achieved by a method for controlling propulsion of a drilling rig. Other objects are achieved by a system for controlling propulsion of a drilling rig.

According to an aspect of the invention there is provided a method for controlling propulsion of the drilling rig, said drilling rig comprising right propulsion means and left propulsion means and mutually independent speed control and a transmission for driving said right propulsion means and left propulsion means, said transmission providing at least two gear states, comprising the steps of:
  requesting propulsion speed for said right propulsion means and for said left propulsion means;
  determining a difference between requested propulsion speed of said right propulsion means and said left propulsion means;
  determining a suitable gear state on the basis of the thus determined difference.

Said at least two gear states is according to an example provided at a gearbox.

Hereby is achieved a reliable and user friendly method for controlling propulsion of a drilling rig. During turning of said drilling rig a suitable, lower, gear state may be determined for allowing automatic downshifting of a transmission of the drilling rig. In this way an operator may be relieved and hereby gain better possibilities for identifying movable or fixed objects or persons in a surrounding of the drilling rig. Hereby the drilling rig may be propelled in a safer way.

Advantageously the number of work tasks is reduced for an operator of the drilling rig, which provides a better working environment and less stress.

The method may comprise the step of:
  propelling said drilling rig by means of tracks or wheels, whereby said drilling rig is made to turn by driving said right propulsion means and said left propulsion means at different speeds.

The method may comprise the step of:

at a determent suitable gear state lower than a current gear state, automatically shifting gear state from said current gear state to said determined lower gear state. Hereby a robust, reliable and user friendly method for controlling propulsion of said drilling rig is achieved. By providing an automated downshift process the number of work tasks for an operator of the drilling rig is reduced.

A suitable gear state may for example be a closest lower gear state compared to a current gear state. In a case where a current gear state for example is a third gear state and it is determined that a reduction to a second gear state is required, said second gear state is hereby denoted a suitable gear state.

A suitable gear state may according to an example be a, in several steps separated, lower gear state compared to a current gear state. In a case where a current gear state for example is a third gear state and it is determined that a reduction to a first gear state is required, said first gear state is hereby denoted a suitable gear state. Depending on a size of said difference between requested propulsion speed of said right and left propulsion means, a number of steps regarding a shift of gear state may be determined. Hereby a new gear state to which a shift should be performed relative current gear state is determined on the basis of the thus determined difference. Said new gear step/gear state may be denoted a suitable gear step/gear state.

A suitable gear state may according to an example be the same gear state as a current gear state. Hereby no automatic change of current gear state will be performed.

The method may comprise the step of:

automatically shifting gear state from said lower gear state to a higher gear state.

The method may comprise the step of:

after the step of automatically shifting gear state from said current gear state to said determined lower gear state, automatically shifting gear state from said lower gear state to a previous higher gear state.

According to an aspect of the invention there is provided a method for controlling propulsion of a drilling rig, said drilling rig comprising right propulsion means and left propulsion means and mutually independent speed control and a transmission for driving said right propulsion means and left propulsion means, said transmission providing at least two gear states, comprising the steps of:

requesting propulsions speed for said right propulsion means and for said left propulsion means;

determining a difference between requested propulsion speed of said right propulsion means and said left propulsion means;

determining gear state on the basis of the thus determined difference, or determining a gear state lower than a current gear state on the basis of the thus determined difference, or determining a relevant gear state, which gear state may be activated, on the basis of thus determined difference.

The method may comprise the step of:

at a determined suitable gear state lower than a current gear state;

presenting a need for shifting gear state from said current gear state to said determined lower gear state for an operator, whereby said operator may choose to manually shift gear state. Hereby is advantageously achieved a splendid basis for decision making for an operator of the drilling rig for allowing safe and environmental friendly propulsion of the drilling rig. By calculating/determining/modelling suitable lower gear state of the drilling rig transmission the drilling rig may be propelled during substantially optimal operation, regarding fuel consumption and generated operational torques of the propulsion means of the drilling rig.

The method may comprise step of:

comparing said difference between requested propulsion speed of said right propulsion means and said left propulsion means with a predetermined threshold value, wherein a suitable gear state is determined if said difference exceeds said threshold value. Hereby it is provided a time effective and robust way to activate/perform for example a shift of gear state of the transmission of the drilling rig.

Advantageously a non-desired shift of gear state will be prevented by said comparison. Hereby it is provided a cost effective way of achieving a reliable operation, driver comfort and reduced ware of components of the drilling rig, for example in a gearbox thereof.

The method may comprise the step of:

determining requested propulsion speed for said right propulsion means and said left propulsion means, whereby said difference is initially determined only if at least one propulsion speed exceeds a predetermined threshold value.

Hereby is achieved a robust way of avoiding non-desired activation of for example a change of gear state of the transmission of the drilling rig. Advantageously a non-desired change of gear state will be prevented by considering said determined requested propulsion speeds. Hereby is provided a cost effective way of achieving reliable operation, driver comfort and reduced ware of components of the drilling rig, such as a gearbox thereof.

The method may comprise the step of:

determining requested propulsion speed for said right propulsion means and said left propulsion means, wherein said gear state automatically may be shifted from a gear state lower than a current gear state in a case were the requested propulsion speeds relate to opposite directions for said right propulsion means and said left propulsion means.

The method may comprise the step of applying hysteresis or filtering of the inventive calculation algorithms for reducing hazard of non-desired frequent changes of gear states upwards and downwards. Hereby is achieved a robust automated control of propulsion of a drilling rig.

According to an aspect of the present invention there is provided a system for controlling propulsion of a drilling rig, said drilling rig comprising right propulsion means and left propulsion means arranged for a mutually independent speed control and a transmission arranged for driving said right propulsion means and left propulsion means, said transmission providing at least two gear states, comprising:

actuator means arranged for requesting propulsion speed for said right propulsion means and for said left propulsion means;

control means arranged for determining a difference between a requested propulsion speed of said right propulsion means and left propulsion means; and control means arranged for determining a suitable gear state on the basis of the thus determined difference.

Said at least two gear states may according to an example be provided at a gearbox.

Said control means being arranged for determining a difference between requested propulsion speed of said right propulsion means and left propulsion means may be denoted first control means.

Said control means being arranged for determining a suitable gear state on the basis of the thus determined difference may be denoted a second control means.

Said drilling rig may be arranged to be propelled by means of tracks or wheels, and hereby be arranged to turn by driving said right propulsion means and said left propulsion means at different speeds.

The system may comprise:
means arranged for, at a determined suitable gear state lower than a current gear state, automatically shifting gear state from said current gear state to said determined lower gear state.

The system may comprise:
means arranged for automatically shifting gear state from said lower gear state to a higher gear state. Said higher gear state may be a previous higher gear state.

The system may comprise:
means arranged for applying hysteresis or filtering of the inventive calculation algorithms for reducing hazard or non-desired frequent changes of gear state upwards and downwards. Hereby a robust automated controlling of propulsion of the drilling rig is achieved.

The system may comprise:
means arranged for, at a determined suitable gear state lower than a current gear state, presenting a need for changing gear state from said current gear state to said determined lower gear state to an operator, wherein means is provided by means said operator manually may change gear state. Said means being arranged for presenting said need may comprise a screen, for example a touch screen. Said means may comprise means for audio and/or tactile and/or visual presentation of information/instructions/recommendations regarding change of said current gear state. Said means may comprise a loud speaker arrangement.

The system may be a semi-automatic system, wherein an operator manually may choose gear state. Hereby the system may comprise means being arranged for, where applicable, automatically changing gear state from a lower gear state to said chosen gear state, said lower gear state has been determined on the basis of said difference between requested propulsion speed of said right propulsion means and said left propulsion means.

The system may comprise:
means arranged for comparing said difference between requested propulsion speed of said right propulsion means and said left propulsion means with a predetermined threshold value; and
means arranged for determining suitable gear state if said difference exceeds said threshold value.

The system may comprise:
means arranged for determining requested propulsion speed of said right propulsion means and said left propulsion means;
means arranged for initially determining said difference only if said at least one requested propulsion speed exceeds a predetermined threshold value.

The system may comprise:
means arranged for determining requested propulsion speed of said right propulsion means and said left propulsion means and automatically changing said gear state to a gear state lower than a current gear state when the requested propulsion speeds relate to opposite directions for said right propulsion means and said left propulsion means.

Said actuator means being arranged for requesting propulsion speed may comprise two separate so called control paddles, one for said right propulsion means and one for said left propulsion means.

Said actuator means being arranged for requesting propulsion speed may comprise a steering means, such as for example a steering wheel or a so called joystick and a separate accelerator means.

Said actuator means being arranged for requesting propulsion speed may comprise only one stick for steering the drilling rig.

Said transmission may comprise a propulsion system for hydraulic control and operation of said propulsion means.

According to an aspect of the present invention there is provided a drilling rig comprising a system for controlling propulsion of a drilling rig. According to an aspect of the present invention there is provided a drilling rig comprising a system. Said drilling rig may be intended for earth surface use.

According to an aspect of the present invention there is provided an autonomous drilling rig comprising an automated system for controlling propulsion said drilling rig. According to an aspect of the present invention there is provided an autonomous drilling rig comprising a system. Said autonomous drilling rig may be intended for earth surface use.

According to an aspect of the present invention there is provided a vehicle equipped with a transmission and two tracks for propelling said vehicle, said vehicle is equipped with a system for controlling propulsion said vehicle. Said vehicle may be an arbitrarily suitable vehicle. Said vehicle may be a mining machine, tractor, dumper, wheel loader, platform comprising an industrial robot, forest machine, earth mover, asphalt construction machine, road planner or a tracked vehicle.

According to an aspect of the present invention there is provided an autonomous vehicle equipped with a transmission and two tracks for propelling said autonomous vehicle, said vehicle is equipped with a system for controlling propulsion of said autonomous vehicle. Said autonomous vehicle may be an arbitrarily suitable autonomous vehicle. Said autonomous vehicle may be a mining vehicle, tractor, dumper, platform comprising an industrial robot, forest machine or tracked vehicle.

According to an aspect of the present invention there is provided a computer program for controlling propulsion of a drilling rig, where said computer program comprises program code for causing an electronic control unit or a computer connected to the electronic control unit to perform the steps.

According to an aspect of the present invention there is provided a computer program product comprising a program code stored on a, by a computer readable medium, for performing the method steps, when said program code is run on an electronic control unit or a computer connected to the electronic control unit.

According to an aspect of the present invention there is provided a computer program for controlling propulsion of a drilling rig, where said computer program comprises program code for causing an electronic control unit or a computer connected to the electronic control unit to perform the steps, when said program code is run on said electronic control unit or said other computer.

According to an aspect of the present invention there is provided a computer program for controlling propulsion of a drilling rig, where said computer program comprises program code stored on a, by a computer readable, medium for causing an electronic control unit or a computer connected to the electronic control unit to perform the steps.

According to an aspect of the present invention there is provided a computer program product comprising a program product comprising a program code stored on a, by a computer readable, medium for performing the methods, when said program code is run on an electronic control unit or a computer connected to the electronic control unit.

According to an aspect of the present invention there is provided a computer program product comprising a program code non-volatile stored on a, by a computer readable, medium for performing the steps, when said program code is run on an electronic control unit or a computer connected to the electronic control unit.

Further objects, advantages and novel features of the present invention will become apparent to the one skilled in the art from the following details, and also by applying the invention. Although the invention is described below, it should be noted that it is not limited to the specific details described. One skilled in the art who has access to the teachings herein will recognize further applications, modifications and incorporations within other fields, which are within the scope of the invention.

BRIEF DESCRIPTION OF THE DRAWINGS

For fuller understanding of the present invention and its further objects and advantages, the detailed description set out below should be read in conjunction with the accompanying drawings, in which the same reference notations denote similar items in the various diagrams, and in which.

DETAILED DESCRIPTION OF THE DRAWINGS

Figure 1A:
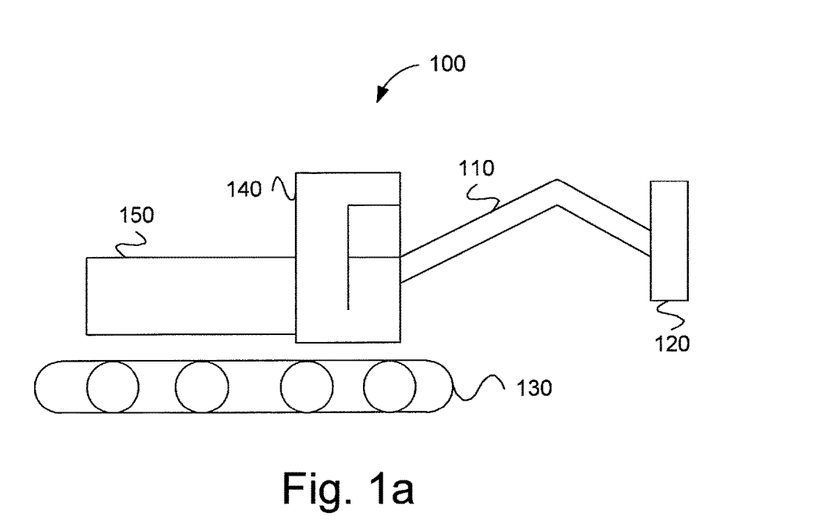
FIG. 1a schematically illustrates a drilling rig.

With reference to FIG. 1a there is illustrated a side view of a drilling rig 100 which may be used for various kinds of ground works and/or construction works and for which the present invention may be used. The drilling rig 100 may be adapted for mining operation. The drilling rig may be adapted for surface mining. Hereby the drilling rig 100 may be adapted for performing so called percussion drilling.

The drilling rig 100 is according to an embodiment arranged for operation in open quarries. The drilling rig 100 is according to an example adapted for use at infrastructure works. The drilling rig 100 may be of any suitable size and may present a mass within an interval of for example 3 to 30 tons (3.000 to 30.000 kilos).

Said drilling rig 100 comprises, among other elements, an elongated, movable arm 110 having a drilling device 120 arranged at one end thereof, tracks 130 for propulsion of the drilling rig 100, a cabin 140 for an operator and a motor body 150. Said movable arm 110 may also be denoted articulated arm.

Said articulated arm may be arranged to be stretched so that it reaches an almost horizontal orientation. Said articulated arm may be arranged to be folded or collapsed. This folding or collapsing may in one embodiment allow that a first part of the articulated arm which is closest to the motor body 150 and the second part of the articulated arm which is closest to the drilling device 120 are almost parallel and almost vertical.

Various components are located in said motor body 150 as well as systems for providing satisfactory function of said drilling rig 100 such as for example an engine 230 which is arranged to provide necessary power to said drilling rig 100. Said engine 230 may thus be used for propulsion of said drilling rig 100, movement of said elongated arm 110 and to operate said drilling device 120. According to an alternative embodiment said engine 230 is used for propulsion of said drilling rig 100, whereby a separate power means (not shown) is used for operating said elongated arm 110 and said drilling device 120. Hereby a unit which is constituted by said motor body 150, said cabin 140 and tracks 130 may be denoted carrier.

Said motor body 150 may also comprise a suitable transmission (not shown) for transmission of power from said engine 230 to said tracks 130. Said transmission may for example be an electronically controlled mechanical transmission. According to an example embodiment said transmission is a hydraulic transmission.

Herein the term "link" refers to a communications link which may be a physical wire, such as an opto-electronic communication wire, or a non-physical wire, such as a wireless connection, for example a radio link or microwave link.

Herein the term "passage" relates to a passage for holding and transporting a fluid, such as for example hydraulic oil. The passage may be a pipe of suitable dimensions. The passage may consist of an arbitrary, suitable material, such as plastics, rubber or metal.

It should be noted that the invention is suitable for application at an arbitrary suitable vehicle or other platform and is not limited to systems of a drilling rig. The inventive method and the inventive system may also be used for other platforms than drilling rigs comprising a transmission and at least two tracks for propulsion, such as mining vehicles, tractors, dumpers, vehicle/platforms for industrial robots, forest machines, tracked vehicles, constructions vehicles, utility vehicles, terrain vehicles or military vehicles.

Herein the term "suitable" among other things may be interpreted as "arbitrary suitable" or "according to a relevant aspect of the invention".

Figure 1B:
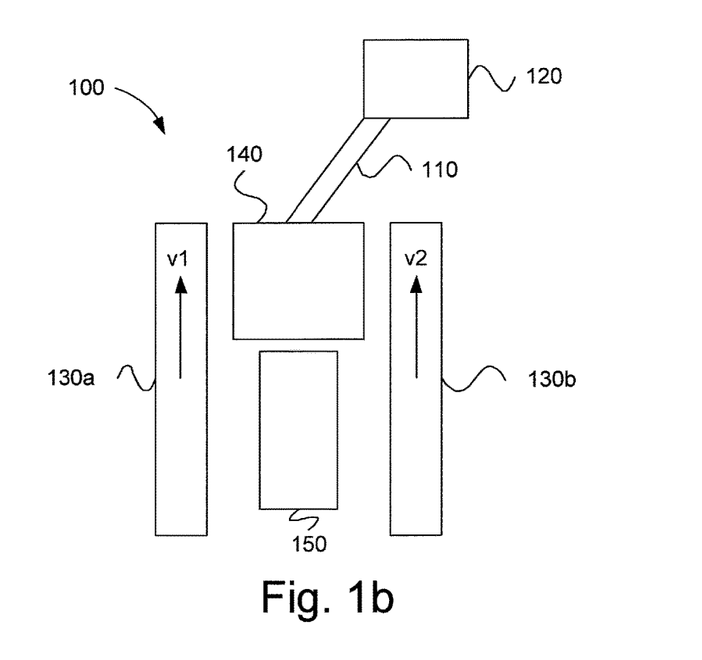
FIG. 1b schematically illustrates a drilling rig.

With reference to FIG. 1b said drilling rig 100 is shown in a view from above.

Said tracks 130, which are illustrated in FIG. 1, are hereby illustrated in greater detail. Said tracks 130 comprise a first propulsion means 130a and a second propulsion means 130b.

Hereby said first propulsion means 130a comprising a first track is illustrated. Said "first propulsion means 130a" is herein also denoted "left propulsion means 130a". Said first propulsion means 130a comprises at least one driving wheel (not shown) at said transmission for driving said first track.

Hereby said second propulsion means 130b comprising a second track is illustrated. Said "second propulsion means 130b" is herein also denoted "right propulsion means 130b". Said second propulsion means 130b comprises at least one driving wheel (not shown) at said transmission for driving said second track.

The drilling rig 100 is arranged to be controlled by means of so called track control. Hereby a respective speed of said first propulsion means 130a and said second propulsion means 130b may be controlled mutually independent. The drilling rig 100 may thus be forced to turn by applying different speeds of said first propulsion means 130a and said second propulsion means 130b. Hereby it should be noted that said first propulsion means 130a and said second propulsion means 130b may be formed in an arbitrarily suitable way, for example by tracks and/or wheels. The important thing according the present invention is that the drilling rig 100 may be turned by means of the track control principle, where speed control of said first propulsion means 130a and said second propulsion means 130b is used for controlling changes of direction of the drilling rig 100.

Hereby it is illustrated that said first propulsion means 130a presents a first speed v1 and said second propulsion means 130b presents a second speed v2. According to this example v1 and v2 are substantially equal, whereby the drilling rig is propelled in a straight direction. Hereby requested speeds v1 and v2 are illustrated. These requested speeds v1 and v2 do not necessarily have to be equal to respective actual speed of said first propulsion means 130a and said second propulsion means 130b. For sake of simplicity it is hereby according to this example assumed that said requested speeds are equally large as said respective requested speeds.

In a case wherein said first speed v1 exceeds said second speed v2 the drilling rig 100 is brought to turn to the right. In a similar way, in a case where said first speed v1 is lower than said second speed v2 the drilling rig 100 may be brought to turn to the left. The corresponding is obviously valid for propulsion in a rear direction of the drilling rig 100. At this rear direction v1 and v2 present opposite directions of the directions which are shown in FIG. 1b. At a rear direction of the drilling rig 100 v1 and v2 present negative signs.

It should be noted that turning of the drilling rig 100 by the means of track control may be performed by that one of said first propulsion means 130a and said second propulsion means 130b stands still, whereby the opposite located propulsion means presents a velocity separate from zero. Turning of the drilling rig 100 by means of track control may for example be performed when v1 equals zero (said first propulsion means 130a stands still), whereby v2 is separate from zero (said second propulsion means 130b is propelled, in a forward direction or a rear direction).

It should be noted that rotation of the drilling rig 100 about its own axel may be performed by means of track control by that said first propulsion means 130a and said second propulsion means 130b provide substantially equally large speeds which are separate from zero, which speeds are oppositely directed. Hereby v1=−v2.

Figure 2:
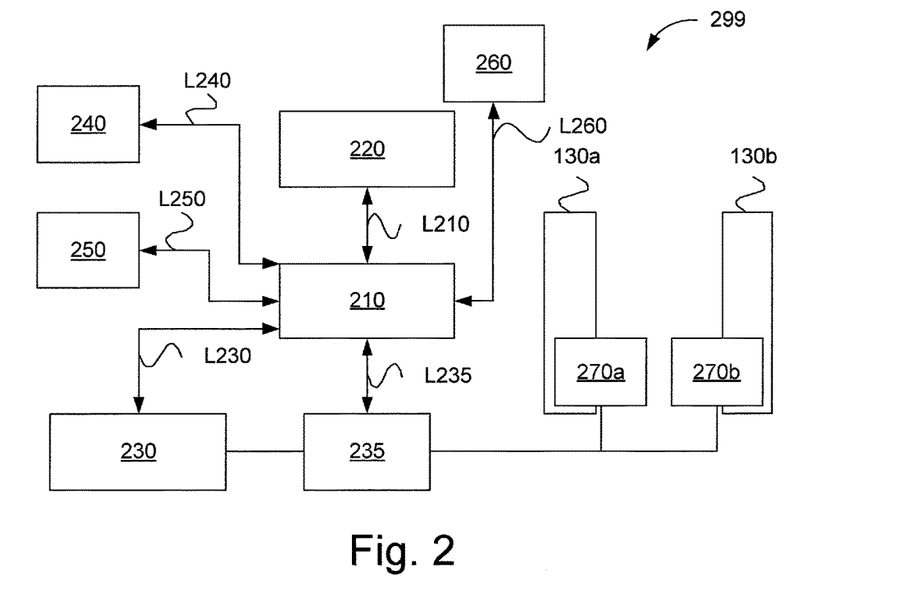
FIG. 2 schematically illustrates a subsystem of the drilling rig which is shown in FIG. 1, according to an embodiment of the invention.

FIG. 2 schematically illustrates a subsystem 299 of said drilling rig 100, according to an aspect of the present invention.

A first control unit 210 is arranged for communication with an engine configuration 230 via a second link L230. The first control unit 210 is arranged to control operation of said engine configuration 230. Said engine configuration 230 may comprise any suitable engine. Said engine configuration 230 may according to an example embodiment comprise a combustion engine, for example a diesel engine. Said engine configuration 230 may according to an example embodiment comprise an electric motor. Controlling of operation of said engine configuration 230 may for an example comprise to control engine speed and/or an output torque.

According to an example embodiment said drilling rig 100 may be equipped with an engine configuration 230 being arranged to propel said first track 130a and said second track 130b by means of hybrid operation, wherein a combustion engine, an energy storage means as well as an electric machine are used.

Said engine configuration 230 is arranged to transmit a torque generated by the engine 230 via a transmission to said right propulsion means 230a and/or said left propulsion means 130b. Said transmission may comprise a gear box 235. Said first control unit 210 is arranged for communication with said gear box 235 via a fifth link L235.

Said gearbox 235 at said transmission may comprise a suitable number of gear steps. Each of these gear steps are herein denoted gear state. According to an embodiment said gearbox may provide separate gear steps for said first track 130a and said second track 130b.

The first control unit 210 is arranged to control said transmission comprising said gearbox 235 for example by shifting gear ratio of said transmission in a suitable way by actively shifting gear states. This may be performed by shifting a current gear step of said gearbox 235.

According to an example embodiment said gearbox 235 provides two gear steps, namely a first gear step GS1 and a second gear step GS2. Said first gear step GS1 provides a lower gear and provides a relatively slow maximum propulsion speed and relatively strong propulsion. Said second gear step GS2 provides a higher gear and provides a relatively high maximum propulsion maximum speed and relatively weak propulsion.

In a corresponding way a transmission having a number of discrete gear steps may provide a sequence of gear steps from a lowest gear with the strongest propulsion to a highest gear with the weakest propulsion. Said transmission may for example provide 2, 3, 4, 5, 6, 10 or 12 discrete different gear steps. These discrete different gear steps are herein denoted gear states.

Said transmission of said drilling rig 100 hereby provides an output torque at a first drive unit 270a of said first propulsion means 130a and at a second drive unit 270b of said second propulsion means 130b. Hereby said first drive unit 270a and said second drive unit 270b are arranged to control transmission of a driving torque to said first propulsion means 130a and said second propulsion means 130b, respectively. This may be performed by means of controlling by the first control unit 210. Hereby a speed of said first propulsion means 130a and said second propulsion means 130b may be controlled mutually independent, whereby said drilling rig 100 hereby provides so called skid steering functionality. Said first drive unit 270a and said second drive unit 270b may be formed in any suitable way. Hereby there is thus no need for regulating, i.e. no so called "closed-loop-control". A control without feedback is sufficient, which provides a simple system of less complexity.

According to an example embodiment there is provided a step less transmission of said drilling rig 100. A power line of said drilling rig 100 hereby comprises said engine configuration 230 and said transmission, comprising said gearbox 235.

The first control unit 210 is arranged for communication with a first actuator means 240 via a third link L240. Said first actuator means 240 is arranged for requesting a propulsion speed of said drilling rig 100. Said activator means 240 is also arranged for requesting a direction of propulsion of said drilling rig 100.

According to a first example embodiment said actuator means 240 comprises two paddles. A first paddle is hereby arranged for requesting a first speed v1 of said first propulsion means 130a. A second paddle is hereby arranged for requesting a second speed v2 of said second propulsion means 130b.

An operator may hereby use said paddles for controlling the propulsion of the drilling rig 100, both regarding propulsion speed and changes of directions (by means of track control).

Hereby said first actuator means 240 is arranged for continuously sending a first signal s1 comprising information about a requested speed v1 of said first propulsion means 130a to the first control unit 210 via the link L240. Hereby said first actuator means 240 is arranged to continuously send a second signal s2 comprising information about a requested speed v2 of said second propulsion means 130b to the first control unit 210 via the third link L240.

According to an alternative, second, example embodiment said first actuator means 240 comprises a first unit and a second unit. Hereby said first unit may comprise a steering wheel or a joystick or any other suitable device for controlling a direction of propulsion of said drilling rig 100. Hereby said second unit may comprise an accelerator actuator means. Said accelerator actuator means may according to an embodiment comprise an accelerator pedal. Hereby said second unit may be used for requesting acceleration and thus a required propulsion speed of said drilling rig 100. The first control unit 210 is hereby arranged to control propulsion of said drilling rig by controlling said transmission and said first drive unit 270a and said second drive unit 270b in a suitable way.

The first control unit 210 is arranged to continuously determine a requested speed v1 of said first propulsion means 130a and a requested speed v2 of said second propulsion means 130b. This may be performed on the basis of signals received from said first actuator means 240. These signals may comprise information about the requested propulsion direction and requested propulsion speed of the drilling rig 100. The first control unit 210 is hereby arranged to determine the two corresponding speeds v1 and v2 so as to control the subsystem 299 in a suitable way.

According to an aspect of the present invention a number of comparison steps are performed by the first control unit 210.

In a first comparison step it is determined whether said requested speed v1 of said first propulsion means 130a exceeds a first predetermined threshold value Th1.

It is hereby determined if $|v1| \geq Th1$.

In a second comparison step it is determined whether said requested speed v2 of said second propulsion means 130b exceeds a second predetermined threshold value Th2.

It is hereby determined if $|v2| \geq Th2$.

Said first threshold value Th1 and said second threshold value Th2 may be arbitrarily suitable threshold values. According to one example said first threshold value Th1=1.0 m/s and said second threshold value Th2=1.0 m/s.

According to one example embodiment said first threshold value Th1 and said second threshold value Th2 may be expressed in percent (%) and may be in the magnitude 10% of maximum requested propulsion speed of the drilling rig 100.

In a third comparison step it is determined if an absolute value of a difference Diff between said first requested propulsion speed v1 and said second propulsion speed v2 exceeds a predetermined third threshold value Th3.

It is determined by if $|v1-v2| \geq Th3$.

According to an alternative embodiment said third comparison step may comprise the step of determining if a ratio between said first requested speed v1 and said second requested speed v2 is lower than a predetermined fourth threshold value Th4. Said fourth threshold value may be an arbitrarily suitable value.

It is hereby determined if $$\frac{v1}{v2} \leq Th4$$

Alternatively it is determined if $$\frac{v2}{v1} \leq Th4$$

in a case where v1 is greater than v2. Division by zero is not performed.

It is hereby depicted that said comparison steps comprise to use values of said first requested speed v1 and said second requested speed v2. An alternative expression is to use the first signal S1 comprising information about said first requested speed v1 and a second signal S2 comprising information about said second requested speed v2. Hereby said signals may be according to the invention in a similar way as depicted above.

According to an example embodiment said first control unit 210 may be arranged to compare a ratio of v1 and v2 or a ratio of v2 and v1 with a number of predetermined threshold values. By example there is provided a unique threshold value for each gear state of said transmission, whereby said unique threshold value is associated with a respective gear state. Hereby the first control unit 210 may be arranged to determine which gear state should be chosen on the basis of said comparisons.

According to an example embodiment said first control unit 210 may be arranged to compare a difference between v1 and v2 or a difference between v2 and v1 with a number of predetermined threshold values. By example there is provided a unique threshold value for each gear state of said transmission, whereby each unique threshold value is associated with a respective gear state. Hereby the first control unit 210 may be arranged to determine which gear state should be chosen, on the basis of said comparisons.

The first control unit 210 is arranged to continuously determine a requested first propulsion sped v1 of said first propulsion means 130a. The first control unit 210 is arranged to continuously determine a requested second propulsion speed v2 of said second propulsion means 130b.

The first control unit 210 is arranged to continuously determine whether said first propulsion speed v1 exceeds said first threshold value Th1. The first control unit 210 is arranged to continuously determine whether said requested second propulsion speed v2 exceeds said second threshold value Th2.

The first control unit 210 is arranged to continuously determine said difference Diff between said requested first propulsion speed v1 of said first propulsion means 130a and said requested second propulsion speed v2 of said second propulsion means 130b.

According to an example embodiment the first control unit 210 is arranged to only determine said difference Diff in a case wherein at least one of said first requested propulsion speed v1 and said second requested propulsion speed v2 exceeds its respective threshold values Th1 and Th2.

According to an example embodiment the first control unit 210 is arranged to only determine said difference Diff if both said first requested propulsion speed v1 and said second propulsion speed v2 exceed their threshold values Th1 and Th2, respectively.

The first control unit 210 is arranged for communication with a second actuator means 250 via a fourth link L250. Said second actuator means 250 comprises a means for choosing gear step of the transmission of the drilling rig. An operator may hereby use said second actuator means 250 for choosing gear state of said gearbox 235.

Said first control unit 210 may be arranged for communication with presentation means 260 via a sixth link L260. Said presentation means 260 may be provided in said cabin 140. Said presentation means 260 may comprise a presentation screen, for example a touch screen. Hereby said first control unit 210 may be arranged to present alphanumerical signs and/or symbols regarding controlling of propulsion of said drilling rig 100. In particular said first control unit 210 may be arranged to present information regarding changes from a current gear state of said transmission.

Said presentation means 260 may comprise means for audio and/or tactile and/or visual presentation of information/instructions/recommendations regarding change of current gear state of said transmission according to the inventive method.

Said first control unit 210 may be arranged to, where applicable, present information comprising instructions for changing gear state of said transmission. Said information may thus be presented in a suitable way by means of said presentation means 260.

Said first control unit 210 may be arranged to determine a difference between a requested propulsion speed of said right propulsion means and a requested propulsion speed of said left propulsion means. Said first control unit 210 may be arranged to determine a suitable gear state of said transmission on the basis of thus determined difference.

Said first control unit 210 may be arranged to propel said drilling rig by means of tracks or wheels, whereby said drilling rig is made to turn by driving said right propulsion means and said left propulsion means at different speeds.

Said first control unit 210 may be arranged to, at a determined suitable gear state lower than a current gear state, automatically changing gear state from said current gear state to said determined lower gear state.

Said first control unit 210 may be arranged to, at a determined suitable lower gear state than a current gear state, by means of said presentation means 260, presenting a need for changing gear state from said current gear state to said determined lower gear state for an operator, whereby said operator may choose to manually change gear state.

Said first control unit 210 may be arranged to compare said difference between requested propulsion speed of said right propulsion means and left propulsion means with a predetermined threshold value, whereby a suitable gear state is determined when said difference exceeds said threshold value.

Said first control unit 210 may be arranged to determine requested propulsion speed for said right propulsion means and left propulsion means, whereby said difference is determined when at least one determined propulsion speed exceeds a predetermined threshold value.

Said first control unit 210 may be arranged to, determine requested propulsion speed for said right propulsion means and left propulsion means, whereby said gear state automatically is changed to a gear state lower than a current gear state in a case said requested propulsion speeds correspond to opposite directions of said right propulsion means and left propulsion means.

A second control unit 220 is arranged for communication with the first control unit 210 via a first link L210. The second control unit 220 may be detachably connected to the first control unit 210. The second control unit 220 may be an external control unit of the drilling rig 100. The second control unit 220 may be arranged to perform the inventive method steps. The second control unit 220 may be used for transferring program code to the first control unit 210, in particular program code for performing the inventive method. The second control unit 220 may alternatively be arranged for communication with the first control unit 210 via an internal network of the vehicle. The second control unit 220 may be arranged to perform substantially similar functions as the first control unit 210.

Figure 3:
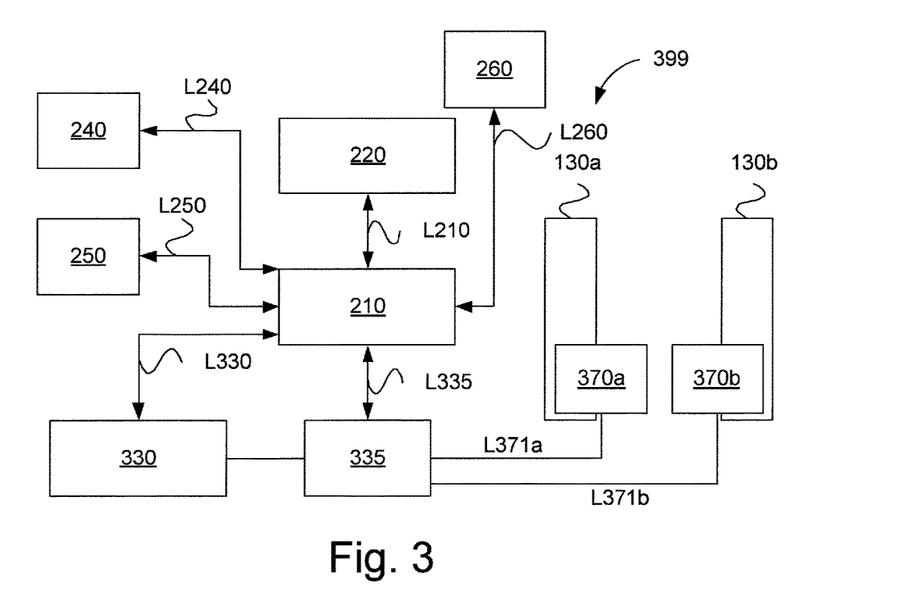
FIG. 3 schematically illustrates a subsystem of the drilling rig which is shown in FIG. 1, according to an aspect of the invention.

FIG. 3 schematically illustrates a subsystem 399 of the drilling rig 100, according to an example embodiment of the present invention.

It should be noted that the present invention may be applied to various kinds of drive systems and transmissions systems of a crawler type drilling rig.

According to an example embodiment the subsystem 399 comprises a hydraulic system with a hydraulic pump 330 which is arranged in fluid communication with a valve configuration 335.

The first control unit 210 is arranged for communication with the hydraulic pump 330 via an eighth link L330. First control unit 210 is arranged to control operation of said hydraulic pump 330.

First control unit 210 is arranged for communication with said valve configuration 335 via a seventh link L335. The first control unit 210 is arranged to control operation of said valve configuration 335.

The valve configuration 335 is arranged for fluid communication with a first drive unit 370*a* via a first conveying passage 371*a*. The valve configuration 335 is arranged for fluid communication with a second drive unit 370*b* via a second conveying passage 371*b*.

The first drive unit 370*a* is arranged to achieve a driving force of said first propulsion means 130*a*. The second drive unit 370*b* is arranged to achieve a driving force of said second propulsion means 130*b*. The first control unit 210 may be signalling connected to said first drive unit 370*a* and said second drive unit 370*b*. Hereby the first control unit 210 may be arranged for controlling a propulsion speed of the first propulsion means 130*a* and the second propulsion means 130*b*.

According to an aspect of the present invention hydraulic pressure of the subsystem 399 is controlled so as to advantageously change gear state of the subsystem 399. Hereby the first control unit 210 is arranged to control said hydraulic pump 330, valve configuration 335, said first drive unit 370*a* and said second drive unit 370*b* according to the innovative method, applied to the schematically depicted hydraulic drive system/transmission system which hereby is incorporated in the subsystem 399. According to an alternative embodiment said hydraulic pump 330 is not controlled via the first control unit 210, but is fully analogue via for example said valve configuration 335.

The sub system 399 comprises the units 240, 250 and 260 which are depicted in greater detail for example with reference to the description of FIG. 2.

According to an aspect of the present invention said drilling rig 100 is an autonomous drilling rig. It should hereby be noted that the drilling rig 100 in such a case is equipped with suitable sensor configurations and navigation means so as to in an autonomous way be used for any suitable application, such as for example drilling works.

According to an example embodiment the inventive system and the inventive drilling rig are arranged to be remotely controlled. Hereby an operator may be located at any suitable distance from the drilling rig 100. The inventive method is hereby applicable by means of use of stored control routines of said first control unit 210 and/or second control unit 220.

Figure 4A:
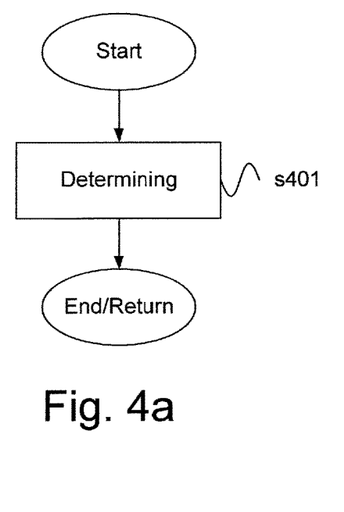
FIG. 4a schematically illustrates a flowchart of a method, according to an aspect of the invention.

FIG. 4*a* schematically illustrates a flowchart of a method for controlling propulsion of a drilling rig, said drilling rig comprising right propulsion means 130*b* and left propulsion means 130*a* and mutually independent speed control and a transmission for driving said right propulsion means 130*b* and said left propulsion means 130*a*, said transmission providing at least two gear states. The method comprises a first method step s401. The step s401 comprises the steps of:
requesting propulsion speed for said right propulsion means 130*b* and for said left propulsion means 130*a*;
determining a difference Diff between requested propulsion speed v2 and said right propulsion means 130*b* and requested propulsion speed v1 of said left propulsion means 130*a*;
determining a suitable gear state on the basis of thus determined difference Diff.

Said at least two gear states are according to an example provided at gearbox 235. After the method step s401 the method ends.

Figure 4B:
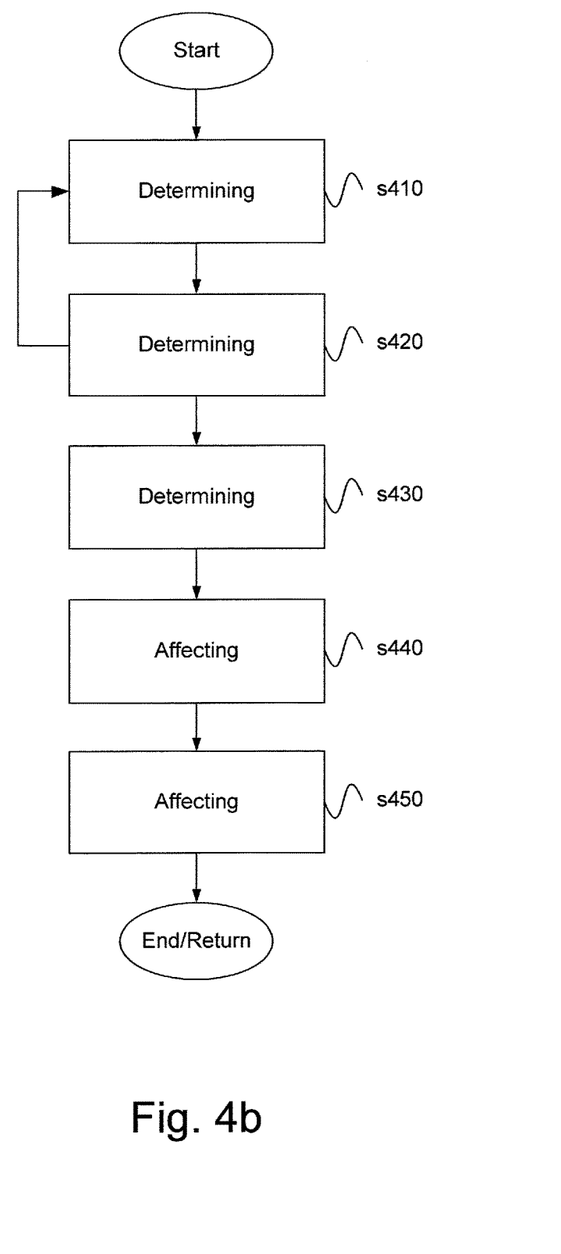
FIG. 4b schematically illustrates a flowchart of a method in greater detail, according to an aspect of the invention.

FIG. 4*b* schematically illustrates a flowchart of a method for controlling propulsion of a drilling rig 100, said drilling rig 100 comprising right propulsion means 130*b* and left propulsion means 130*a* and mutually independent speed control and a transmission for driving said right propulsion means 130*b* and said left propulsion means 130*a*, said transmission providing at least two gear states. Said flowchart is an example embodiment of a method for controlling propulsion of a drilling rig 100. The method comprises a first method step s410.

The step s410 may comprise the step of continuously determining a requested speed for propulsion of said drilling rig 100. The step s410 hereby comprises the step of continuously determining a requested speed v1 of said first propulsion means 130*a*. The step s410 hereby comprises the step of continuously determining a requested speed v2 of said second propulsion means 130*b*.

The step s410 may comprise the step of continuously determining a difference Diff between said requested speed v1 of said first propulsion means 130*a* and said requested speed v2 of said second propulsion means 130*b*.

The step s410 may be performed by the first control unit 210 by considering a, by an operator requested, propulsion speed V regarding the drilling rig 100. Depending on which configuration said first activator means 240 presents said requested speed v1 of the first propulsion means 130*a* and said requested speed v2 of said second propulsion means 130*b* may be determined in different ways. A requested propulsion speed V of said drilling rig 100 may however continuously be distributed as components for the first propulsion means 130*a* and said second propulsion means 130*b*.

After the method step s410 there is performed a subsequent method step s420.

The step s420 may comprise the step of determining whether a number of predetermined criteria regarding said requested propulsion of the drilling rig 100 are met.

A first criterion may be that said first requested propulsion speed v1 shall exceed said first threshold value Th1. A second criterion may be that said second propulsion speed v2 shall exceed said second threshold value Th2. A third criterion may be that said difference Diff between said first requested propulsion speed v1 and said second requested propulsion speed v2 shall exceed a third threshold value Th3. A fourth criterion may be that a current gear state of said transmission shall be different from a lowest gear state. In other words it should be possible to shift down from a current gear state to a lower gear state, for example from GS2 to GS1.

According to an embodiment the method may comprise a step of automatically upshifting to a higher gear state in a case where at least one criterion for automatic downshifting no longer is met. According to an embodiment the method may comprise the step of automatically upshifting to a higher gear state in a case where all said criteria for automatic downshifting are not met.

According to an aspect of the present invention the method may comprise the step of, after an automatic downshifting has been performed, and at least one of said criteria no longer are met, automatically upshifting to a suitable gear step. According to an example embodiment automatic upshifting may be performed so that a predetermined gear step is activated after a course comprising said inventive automatic downshifting. This automatic upshifting may be conditional by that at least one of said criteria no longer met.

The step s420 may comprise the step of determining a difference Diff between requested propulsion speed of said right propulsion means and said left propulsion means.

In a case where at least said third criterion is met a subsequent method step s430 is performed. In other case the method returns to the method step s410.

According to an example embodiment all four criteria need to be met to allow said subsequent method step s430 to be performed. In other case the method returns to the method step s410.

The step s430 may comprise the step of determining suitable gear state of the transmission of the drilling rig on the basis of the thus determined difference Diff. Said suitable gear state may be determined on the basis of a size of said determined difference Diff. This may be performed by means of the first control unit 210.

According to an embodiment a difference between a current gear state and said determined suitable gear state may be proportional to said difference Diff between said first requested propulsion speed v1 and said second requested propulsion speed v2. I.e. for a relatively large difference Diff a relatively low gear state compared to said current gear state may be determined.

After the method step s430 there is performed a subsequent method step s440.

The step s440 may comprise the step of affecting gear state of said transmission. The step s440 may comprise the step of controlling shift of a current gear state of said transmission.

The step s440 may comprise the step of, at a determined suitable lower gear state than a current gear state, automatically shifting gear state from said current gear state to said determined lower gear state.

According to an alternative example the method step s440 may comprise the step of, at a determined suitable gear state lower than a current gear state, presenting a need of shifting gear state from said current gear state to said determined lower gear state for an operator, whereby said operator may choose to manually shift gear state. Hereby said first control unit 210 may be used for controlling presentation regarding said shift of gear state of said transmission. Hereby the method step s440 may comprise the step of presenting information about which specific determined gear state is recommended. This may be performed by means of an audio-visual instruction to an operator of the drilling rig 100.

After the method step s440 a subsequent method step s450 is performed.

The step s450 may comprise to the step of, where applicable, affecting gear state of said transmission. The step s450 may comprise the step of, where applicable, control shifting of current gear state of said transmission. This may be performed by means of the first control unit 210.

Hereby a lower gear state may be changed to a former higher gear state. This may be performed when said difference Diff is lower than said third threshold value Th3. This may be performed after that the drilling rig 100 has turned.

It should be noted that the inventive method is suitable for an autonomous drilling rig 100. Hereby the first control unit 200 may be arranged to automatically perform the depicted method steps, such as for an example requesting a first propulsion speed v1 and a second propulsion speed v2, determining a difference Diff between said first propulsion speed v1 and said second propulsion speed v2, determining whether said four criteria are met, determining suitable gear state on the basis of said difference Diff and changing said gear state. Said automated change of said gear state may be performed as a downshift of said gearbox 235, respective valve configuration 335, before or during a turn of the drilling rig 100, and thereafter as an upshift of said gearbox 235, respective valve configuration 335, during a later part of said turn or after said turn of the drilling rig 100.

After the method step s450 the method ends. Alternatively the method step s410 is performed again.

Figure 5:
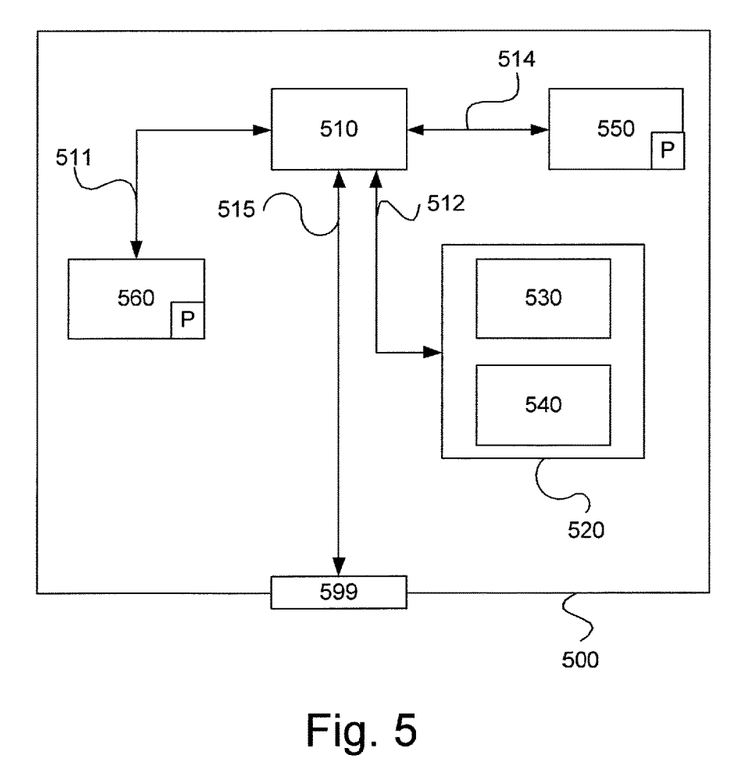
FIG. 5 schematically illustrates a computer, according to an aspect of the invention.

With reference to FIG. 5 there is illustrated a diagram of an embodiment of a device 500. The control units 210 and 220 depicted with reference to FIG. 2 may in one version comprise the device 500. The device 500 comprises a non-volatile memory 520, a data processing unit 510 and a read/write memory 550. The non-volatile memory 520 has a first memory portion 530 wherein a computer program, such as an operative system, is stored for controlling the function of the device 500. The device 500 further comprises a bus-controller, a serial communication port, I/O means, ND converter, a time and date input and transfer unit, an event counter and an interruption controller (not shown). The non-volatile memory 520 also has a second memory portion 540.

There is provided a computer program P comprising routines for controlling propulsion of a drilling rig, said drilling rig comprising right propulsion means and left propulsion means and mutually independent speed control and a transmission for driving said right propulsion means and said left propulsion means, said transmission providing at least two gear states.

The computer program P may comprise routines for continuously and/or intermittently determining a requested propulsion speed for said right propulsion means. The computer program P may comprise routines for continuously and/or intermittently determining a requested propulsion speed for said left propulsion means.

The computer program P may comprise routines for continuously and/or intermittently determining a difference between said right propulsion means and said left propulsion means. The computer program P may comprise routines for continuously and/or intermittently determining suitable gear state on the basis of the thus determined difference between requested propulsion speed of said right propulsion means and said left propulsion means.

The computer program P may comprise routines for continuously and/or intermittently determining a difference between said determined requested propulsion speed of said right propulsion means and said determined requested propulsion speed of said left propulsion means. The computer program may comprise routines for determining suitable gear state on the basis of the thus determined difference between said determined requested propulsion speed of said right propulsion means and said determined requested propulsion speed of said left propulsion means.

The computer program P may comprise routines for propelling said drilling rig by means of tracks or wheels, wherein said drilling rig is made to turn by driving said right propulsion means and said left propulsion means at different speeds.

The computer program P may comprise routines for continuously and/or intermittently determining a current gear state of a transmission of the drilling rig 100.

The computer program P may comprise routines for continuously and/or intermittently determining whether a shifting of said current gear state is suitable. This may be performed on the basis of the thus determined difference between said determined requested propulsion speed of said right propulsion means and said determined requested propulsion speed of said left propulsion means.

The computer program P may comprise routines for, at a determined suitable gear state lower than a current gear state, automatically shifting gear state from said current gear state to said determined lower gear state.

The computer program P may comprise routines for automatically shifting gear state from said determined lower gear state to a former higher gear state. Said higher gear state may be a previously higher gear state.

The computer program P may comprise routines for, at a determined suitable gear state lower than a current gear state, presenting a need for shifting gear state from said current gear state to said determined lower gear state for an operator.

The computer program P may comprise routines for comparing said difference between requested propulsion speed of said right propulsion means and said left propulsion means with a predetermined threshold value. The computer program P may comprise routines for determining a suitable gear state if said difference exceeds said threshold value.

The computer program P may comprise routines for determining requested propulsion speed for said right propulsion means and said left propulsion means, whereby said difference is initially determined only if at least one requested propulsion speed exceeds a predetermined threshold value.

The computer program P may comprise routines for determining requested propulsion speed for said right propulsion means and said left propulsion means, wherein said gear state automatically is shifted to a gear state lower than a current gear state in a case where the requested propulsion speeds relate to opposite directions for said right propulsion means and said left propulsion means.

The computer program P may comprise routines for, after a gear state has been shifted to said determined lower gear state, where applicable, automatically shifting gear state to a higher gear state than said determined lower gear state.

The computer program P may comprise routines for, after a gear state has been shifted to said determined lower gear state, where applicable, presenting information regarding a recommendation to shift gear state to a higher gear state than said determined lower gear state for an operator of said drilling rig.

The computer program P may be stored in an executable form or in compressed form in a memory 560 and/or in a read/write memory 550.

Where it is stated that the data processing unit 510 performs a certain function, it means that the data processing unit 510 affects a certain part of the program stored in the memory 560 or a certain part of the program stored in the read/write memory 550.

The data processing device 510 can communicate with a data port 599 via a fourth data bus 515. The non-volatile memory 520 is intended for communication with the data processing unit 510 via a second data bus 512. The separate memory 560 is intended to communicate with the data processing unit 510 via a first data bus 511. The read/write memory 550 is intended to communicate with the data processing unit 510 via a third data bus 514. The data port 599 may for example be connected to the first link L210, second link L230, third link L240, fourth link L250, fifth link L235, sixth link L260, seventh link L335 and eighth link L330 (see FIG. 2 and FIG. 3).

When data are received on the data port 599, they are stored temporarily in the second memory element 540. When input data received have been temporarily stored, the data processing unit 510 will be ready to effect code execution in a manner described above. In one version, signals received on the data port 599 comprise information about a requested speed of the drilling rig 100. In one version, signals received on the data port 599 comprise information about requested propulsion speed v1 of said first propulsion means 130*a*. In one version, signals received on the data port 599 comprise information about requested propulsion speed v2 of said second propulsion means 130*b*. In one version, signals received on the data port 599 comprise information about requested propulsion speed v1 of said first propulsion means 130*a* and requested propulsion speed v2 of said second propulsion means 130*b*.

Parts of the methods herein described may be applied by the device 500 by means of the data processing unit 510 which runs the program stored in the memory 560 or the read/write memory 550. When the device 500 runs the program, methods herein described are executed.

The foregoing description of the preferred embodiments of the present invention is provided for illustrative and descriptive purposes. It is not intended to be exhaustive, nor to limit the invention to the variants described. Many modifications and variations will obviously suggest themselves to one skilled in the art. The embodiments have been chosen and described in order best to explain the principles of the invention and its practical applications and hence to make it possible for one skilled in the art to understand the invention for various embodiments and with the various modifications appropriate to the intended use.

The invention claimed is:

1. A method for controlling propulsion of a drilling rig, said drilling rig comprising a right propulsion unit and a left propulsion unit and mutually independent speed control and a transmission for driving said right propulsion unit and left propulsion unit, said transmission providing at least two gear states of a gearbox, the method comprising:

requesting a propulsion speed for said right propulsion unit and for said left propulsion unit, determining a difference between a requested propulsion speed of said right propulsion unit and said left propulsion unit; and determining suitable gear state on the basis of the thus determined difference.

2. The method according to claim 1, further comprising: propelling said drilling rig utilizing tracks or wheels, wherein said drilling rig is made to turn by driving said right propulsion unit and left propulsion unit at different speeds.

3. The method according to claim 1, further comprising: at a determined suitable gear state lower than a current gear state, automatically shifting gear state from said current gear state to said determined lower gear state.

4. The method according to claim 3, further comprising: after automatically shifting gear state from said current gear state to said determined lower gear state, automatically shifting gear state from said lower gear state to a former higher gear state.

5. The method according to claim 1, further comprising: at a determined suitable gear state lower than a current gear state presenting a need for shifting gear state from said current gear state to said determined lower gear state to an operator, whereby said operator may choose to manually shift gear state.

6. The method according to claim 1, further comprising: comparing said difference between requested propulsion speed of said right propulsion unit and said left propulsion unit with a predetermined threshold value, whereby a suitable gear state is determined if said difference exceeds said threshold value.

7. The method according to claim 1, further comprising: determining requested propulsion speed for said right propulsion unit and said left propulsion unit, whereby said difference is initially determined only if at least one requested propulsion speed exceeds a predetermined threshold value.

8. The method according to claim 1, further comprising: determining requested propulsion speed for said right propulsion unit and said left propulsion unit, wherein said gear state automatically is shifted to a gear state lower than a current gear state in a case where the requested propulsion speeds relate to opposite directions for said right propulsion unit and said left propulsion unit.

9. A computer program for controlling propulsion of a drilling rig, said computer program comprising:

program code for causing an electronic control unit or a computer connected to the electronic control unit to perform the method according claim 1.

10. A computer program product, comprising:

a program code stored on a computer readable medium, for performing the method according to claim 1, when said program code is run on an electronic control unit or a computer connected to said electronic control unit.

11. A system for controlling propulsion of a drilling rig, said drilling rig comprising a right propulsion unit and a left propulsion unit and mutually independent speed control and a transmission for driving said right propulsion unit and said left propulsion unit, said transmission providing at least two gear states of a gear box, the system comprising:

an actuator for requesting propulsion speed for said right propulsion unit and for said left propulsion unit, a first control for determining a difference between a requested propulsion speed of said right propulsion unit and said left propulsion unit; and a second control for determining suitable gear state on the basis of the thus determined difference.

12. The system according to claim 11, wherein said drilling rig is arranged to be propelled by tracks or wheels, and hereby arranged to be made to turn by driving said right propulsion unit and left propulsion unit at different speeds.

13. The system according to claim 11, further comprising:
said transmission for, at a determined suitable gear state lower than a current gear state, automatically shifting gear state from said current gear state to said determined lower gear state.

14. The system according to claim 13, further comprising:
said transmission for automatically shifting gear state from said determined lower gear state to a former higher gear state.

15. The system according to claim 11, further comprising:
an indicator for, at a determined suitable gear state lower than a current gear state, presenting a need to shifting gear state from said current gear state to said determined lower gear state for an operator; and
said transmission for allowing an operator to manually shift gear state.

16. The system according to claim 11, further comprising:
a comparison module configured to compare said difference between requested propulsion speed of said right propulsion unit and said left propulsion unit with a predetermined threshold value; and
a determining module configured to determine a suitable gear state if said difference exceeds said threshold value.

17. The system according to claim 11, further comprising:
a determining module configured to determine requested propulsion speed for said right propulsion unit and said left propulsion unit; and
a determining module configured to initially determine said difference only if at least one requested propulsion speed exceeds a predetermined threshold value.

18. The system according to claim 11, further comprising:
a determining module configured to determine requested propulsion speed for said right propulsion unit and said left propulsion unit and to automatically shifting said gear state to a gear state lower than a current gear state if the requested propulsion speeds relate to opposite directions of said right propulsion unit and said left propulsion unit.

19. The system according to claim 11, wherein said actuator is configured to request propulsion speed comprises two separate control paddles, one for said right propulsion unit and one for said left propulsion unit.

20. The system according to claim 11, wherein said actuator is configured to request propulsion speed comprises a control and a separate accelerator.

21. The system according to claim 11, wherein said transmission comprises a propulsion system for hydraulic control and operation of said propulsion unit.

22. A drilling rig, comprising:
a system according to claim 11.

* * * * *